[19] United States Patent
Hugon et al.

(10) Patent No.: US 8,616,271 B2
(45) Date of Patent: Dec. 31, 2013

(54) THERMAL CONTROL DEVICE ON BOARD A SPACECRAFT

(75) Inventors: Julien Hugon, Aristide Briand (FR); Thierry Dargent, Auribeau sur Siagne (FR); Isabelle Nann, Aristide Briand (FR); Paul De Larminat, Nantes (FR)

(73) Assignee: Thales, Neuilly Ser Seine (FR)

( * ) Notice: Subject to any disclaimer, the term of this patent is extended or adjusted under 35 U.S.C. 154(b) by 1554 days.

(21) Appl. No.: 12/037,186

(22) Filed: Feb. 26, 2008

(65) Prior Publication Data
US 2008/0217483 A1 Sep. 11, 2008

(30) Foreign Application Priority Data
Feb. 26, 2007 (FR) ...................... 07 53500

(51) Int. Cl.
B60H 1/00 (2006.01)
F16F 1/06 (2006.01)
F25B 5/00 (2006.01)
F25B 49/00 (2006.01)
F25B 7/00 (2006.01)

(52) U.S. Cl.
USPC .......... 165/202; 165/41; 165/104.25; 165/71; 62/199; 62/196.4; 62/175

(58) Field of Classification Search
USPC ........ 165/41, 103; 62/199, 196.1, 196.4, 239, 62/510, DIG. 5, 172, 402, 324.4
See application file for complete search history.

(56) References Cited

U.S. PATENT DOCUMENTS 2,486,141 A * 10/1949 Follo ................................ 138/37
3,495,418 A * 2/1970 Kapich ............................ 62/227
4,614,089 A * 9/1986 Dorsey ............................. 62/158
4,679,404 A * 7/1987 Alsenz ............................. 62/175
4,798,242 A * 1/1989 Kito et al. ....................... 165/103
5,000,257 A * 3/1991 Shinmura ....................... 165/140
5,142,884 A * 9/1992 Scaringe et al. ............. 62/324.4
5,267,605 A * 12/1993 Doty et al. ....................... 165/41

(Continued)

FOREIGN PATENT DOCUMENTS

FR 2 812 075 1/2002

OTHER PUBLICATIONS

Supper, W. "Two-Phase Heat-Transport Systems for Spacecraft." ESA Bulletin, ESA Scientific and Publications Branch, Noordwijk, NL, No. 66, May 1, 1991, pp. 64-70, XP000222553, ISSN: 0376-4265.

(Continued)

Primary Examiner — Khoa Huynh
Assistant Examiner — Timothy K. Trieu
(74) Attorney, Agent, or Firm — Lowe Hauptman & Ham, LLP

(57) ABSTRACT

The invention relates to a thermal control device intended to dissipate the heat generated by a payload on a spacecraft, comprising a number of surfaces and including means for circulating a refrigerant. An evaporation zone ($Z_1$) comprises means for circulating the refrigerant, a compression zone ($Z_2$), a condensation zone ($Z_3$) comprising at least one radiating panel, linked to a part of the means for circulating the refrigerant, including several branches and comprising means to allow or inhibit the circulation of the refrigerant within these branches so as to vary the area of the heat exchange surface in the condensation zone, a pressure reduction zone ($Z_4$) comprising means for circulating the refrigerant. Such a device is particularly well adapted to thermal problems encountered in telecommunications satellites.

20 Claims, 2 Drawing Sheets

(56) References Cited

U.S. PATENT DOCUMENTS

| | | | |
|---|---|---|---|
| 5,396,779 A * | 3/1995 | Voss | 62/196.2 |
| 5,943,877 A * | 8/1999 | Chen | 62/402 |
| 6,220,548 B1* | 4/2001 | Hyman | 244/172.6 |
| 6,883,588 B1* | 4/2005 | Low et al. | 165/41 |
| 6,913,074 B2* | 7/2005 | Yamamoto et al. | 165/184 |
| 7,055,337 B2* | 6/2006 | Horn et al. | 62/199 |
| 7,086,244 B2* | 8/2006 | Yamasaki et al. | 62/196.2 |
| 7,155,920 B2* | 1/2007 | Lifson et al. | 62/175 |
| 2001/0025507 A1* | 10/2001 | Buchholz et al. | 62/402 |
| 2005/0223737 A1* | 10/2005 | Conry | 62/510 |

OTHER PUBLICATIONS

De Parolis, M. N. et al. "Current and Future 1-15 Techniques for Spacecraft Thermal Control Designdrivers and Current Technologies." ESA Bulletin, ESA Scientific and Publications Branch, Noordwijk, NL, No. 87, Aug. 1, 1996, pp. 73-83. XP000624080, ISSN: 0376-4625.

* cited by examiner

THERMAL CONTROL DEVICE ON BOARD A SPACECRAFT

CROSS REFERENCE TO RELATED APPLICATIONS

The present application is based on, and claims priority from, French Patent Application No. 07 53500, filed Feb. 26, 2007, the disclosure of which is hereby incorporated by reference herein in its entirety.

FIELD OF THE INVENTION

The invention relates to a thermal control device on board a satellite or more generally on board a spacecraft.

BACKGROUND OF THE INVENTION

Generally speaking, satellites comprise a series of pieces of equipment which, when functioning, generate heat that it is necessary to discharge effectively into cold space so that the temperature of this equipment remains within a nominal temperature range. The use of heat pipes to transport the heat generated by spacecraft equipment is commonly suggested. Heat pipes transfer thermal energy towards radiators. If the heat pipes form a fluid loop, the radiators can also be deployed thus to increase area of the radiating surfaces after the launch phase to ensure thermal control. More precisely, in a conventional thermal control system, equipment positioned inside satellites works at temperature ranges such that the discharge temperature of the energy dissipated into space via the radiator structures is limited by these ranges. For a given thermal energy to be removed the required radiating area (and therefore the thermal control mass) is therefore intimately linked to a limiting temperature level. Thus for very energetic missions the thermal subsystem becomes very large, since it is this which fixes the dimensions of the satellite (surfaces of the satellite walls), unless the use of bulky and heavy dedicated deployable structures is envisaged to increase the area of these radiating surfaces.

In fact, when the thermal discharge capacity of a satellite's walls is exceeded, the known solutions for removing the surplus dissipation are essentially the use of capillary fluid loops or mechanically pumped fluid loops linking the interior of the satellite to deployable radiators dedicated to thermal control. The latter are bulky and heavy. To this day (most of) these solutions and the associated European thermal products still require a qualifying phase in flight. The working temperature of the radiator or radiators (conventional or deployable) is necessarily lower than the maximum temperature acceptable for the equipment to be controlled, which impacts greatly on the dimensions required for these radiators and therefore limits the possibilities for their arrangement on the satellite.

SUMMARY OF THE INVENTION

To overcome these problems the present invention proposes the use of a thermal control system of the refrigerating machine type to decouple the equipment whose temperature is to be controlled from the radiators associated with them, that is the temperature of the radiator(s) can be increased as much as is desired. The radiators, having a direct field of view with cold space, can radiate at very high temperature without impacting on the proper functioning of the equipment so as thus to increase their thermal efficiency and allow a radical reduction in the area of the radiating surfaces dedicated to thermal control in relation to conventional thermal control.

More precisely, through the means of circulation, the device of the invention proposes first to take the thermal dissipation belonging to the satellite or to a part of the satellite (refrigeration energy) using a refrigerant (evaporation zone of the device), then to compress the resultant vapour (thus ensuring circulation of the refrigerant) and thus raising the temperature of the refrigerant. At the compression zone outlet of the device the refrigerant in the gas state will condense in the dedicated radiating panels (condensation zone of the device), which discharge, by radiation at high temperature, the total energy into cold space (sum of the refrigeration energy and the compressor's own consumption). The pressure of the refrigerant is then reduced (pressure reduction zone of the device) in order to return to the evaporation zone with the appropriate thermodynamic properties.

More precisely, the invention is situated in the condensation zone, which comprises the means to vary the area of the heat exchange surface according to the quantity of thermal energy to be discharged into space.

To do this, one subject of the invention is a thermal control device intended to remove the heat generated by heat dissipating equipment on a spacecraft comprising a number of surfaces and including:
  means for circulating a refrigerant;
  an evaporation zone comprising means for circulating the refrigerant;
  a compression zone;
  a condensation zone comprising at least one radiating panel, linked to a part of the means for circulating the refrigerant, including several branches and comprising means to allow or inhibit the circulation of the said refrigerant within these branches so as to vary the area of the heat exchange surface in the condensation zone; and
  a pressure reduction zone comprising means for circulating the refrigerant.

According to a variant of the invention, the condensation zone is linked with several radiating panels. These radiating panels are composed of several parts. The means for circulating the refrigerant from one part of a radiating panel towards part of another radiating panel are mounted in series. Ideally, the number n of parts per radiating panel is equal to the number n of radiating panels, the n radiating panels therefore being connected in series by n−1 means of circulation, the n parts being passed through by the refrigerant having an identical discharge area.

According to a variant of the invention, the branches consist of tubes with grooved surfaces.

According to a variant of the invention, at each radiating panel the condensation zone comprises a system of automatic valves allowing all or part of the surface of the radiating panel to be used to remove heat, the refrigerant then circulating in all or part of the said branches.

According to a variant of the invention, the evaporation zone furthermore comprises heating means allowing centralized heating. In this way the thermal dissipation of the satellite or of the equipment concerned can be replaced by heating if the equipment dissipates too little or no longer dissipates. The opportunity should be noted here of being able to heat centrally, that is to have a set of heaters more or less grouped together and located somewhere on the means for circulating the refrigerant downstream of the condenser and upstream of the compressor. These heating zones are nothing but further evaporation zones that are used if needed. This simplifies considerably the design of the heating lines.

According to a variant of the invention, the evaporation zone comprises one or more pieces of equipment controlled at a single temperature level or at several different temperature levels.

According to a variant of the invention, the compression zone comprises several compression stages, the number of stages being equal to the number of temperature levels of the evaporator to be controlled.

According to a variant of the invention, the compression zone comprises at least one magnetic-bearing centrifugal compressor.

According to a variant of the invention, the device comprises a bypass system between the compression zone and the condensation zone, allowing the temperature of the refrigerant to be adjusted.

Another subject of the invention is a spacecraft including a thermal control device according to the invention.

According to a variant, this is a telecommunications spacecraft with faces commonly called North and South, characterized in that it comprises external radiating panels, fixed to the North and South faces, equipped with the condensation zone of the thermal control device, the said radiating panels being conductively and radiatively decoupled from these North and South faces.

According to a variant of the invention, the spacecraft comprises evaporation, compression and pressure reduction zones inside the spacecraft.

Advantageously, it comprises a communication module and a service module, the external radiating panels being situated on the communication module.

It may also have external radiating panels on the face(s) commonly called the East, West, Earth and anti-Earth faces.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Generally speaking, the thermal control device of the invention comprises various components designed to take on the diverse environmental constraints and diverse operating constraints of the satellite or of the equipment controlled.

Figure 1:
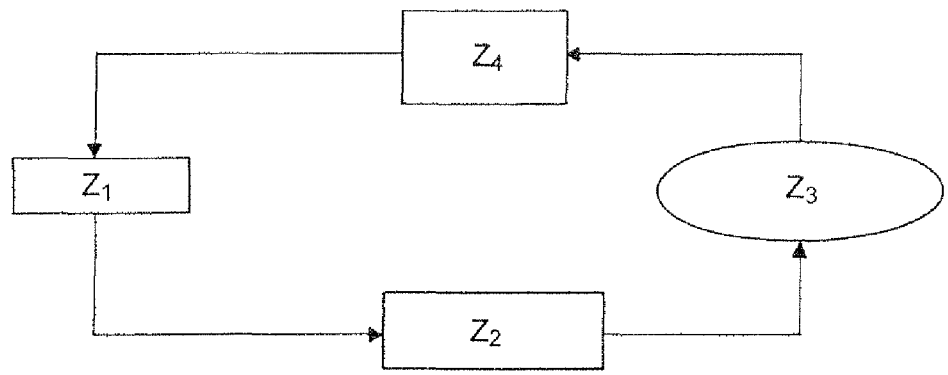
FIG. 1 is a scheme of the various condensation, pressure reduction, evaporation and compression zones used in a device of the invention.

The device of the invention is illustrated schematically in FIG. 1. It comprises an evaporation zone $Z_1$, a compression zone $Z_2$, a condensation zone $Z_3$ and a pressure reduction zone $Z_4$, as well as means for circulating a refrigerant.

More precisely, it consists of first taking the thermal dissipation belonging to the satellite or to several pieces of the satellite's equipment using a refrigerant (evaporation zone $Z_1$ of the device), then compressing the resultant vapour (compression zone $Z_2$ within which the refrigerant thus circulates) and thus raising the temperature of the refrigerant. At the compression zone outlet of the device the refrigerant condenses in the dedicated radiating panels (condensation zone $Z_3$ of the device), which discharge, by radiation at high temperature, the total energy into cold space. These panels are thermally, conductively and radiatively, decoupled from the support structures of the equipment, which allows the temperature of the radiators to be increased significantly without impacting on the temperature of the satellite's equipment and therefore on its proper functioning. The pressure of the refrigerant is then reduced (pressure reduction zone $Z_4$ of the device) in order to return to the evaporation zone with the appropriate thermodynamic properties.

The principle is set out in detail below. Note that through appropriate design of the system the temperatures of the one or more pieces of equipment and of the radiating panel(s) can be chosen to be as low or as high as desired. If it is necessary to keep various parts of the satellite at different temperature levels, it is advantageous to use a multistage compression concept which, notably, allows the device output to be increased. The radiators linked with the condensation zone can be situated anywhere on the exterior of the satellite provided that they do not disturb the proper running of the mission (notably, field of view with external appendages) and that their interaction with the propulsion subsystem is not critical (pollution of the radiating surfaces and therefore loss of efficiency of the latter over the lifetime of the satellite).

The use of dedicated deployable radiators is nonetheless conceivable, even if the concept can be freed from the need for the latter.

The possibility of discharging the thermal dissipation of the satellite at high temperature also allows the use of coatings not optimized for radiating panels (for example, white paint). In fact, the incident solar flux absorbed per unit area can become of second order compared with the infrared flux discharged by the panels if the radiation temperature of the latter is correctly chosen. The use of mirror coatings is then no longer necessary. The manufacturing cost and the mass of the radiators can thus be reduced.

The condensation zone $Z_3$, comprising several branches in the means for circulating the refrigerant, will be described in a more detailed manner in an exemplary embodiment. Specifically, the type of circulation suggested makes the system robust and guarantees thermal control throughout the life of the satellite, that is to say for very varied environmental conditions and very variable cases of thermal loading (refrigeration energy). Thus designed, the system of the invention assures thermal control for a large number of working modes of the satellite or of the thermally controlled equipment (low and high thermal loading, worst hot and worst cold environments) from the launch phase until the end of its life. Thanks to the device of the invention it is possible to double the total heat discharge capacity of a telecommunications satellite and therefore, for a given platform size, to be able to accept missions twice as energetic as at present without necessarily changing the scale of the platform.

Figure 2:
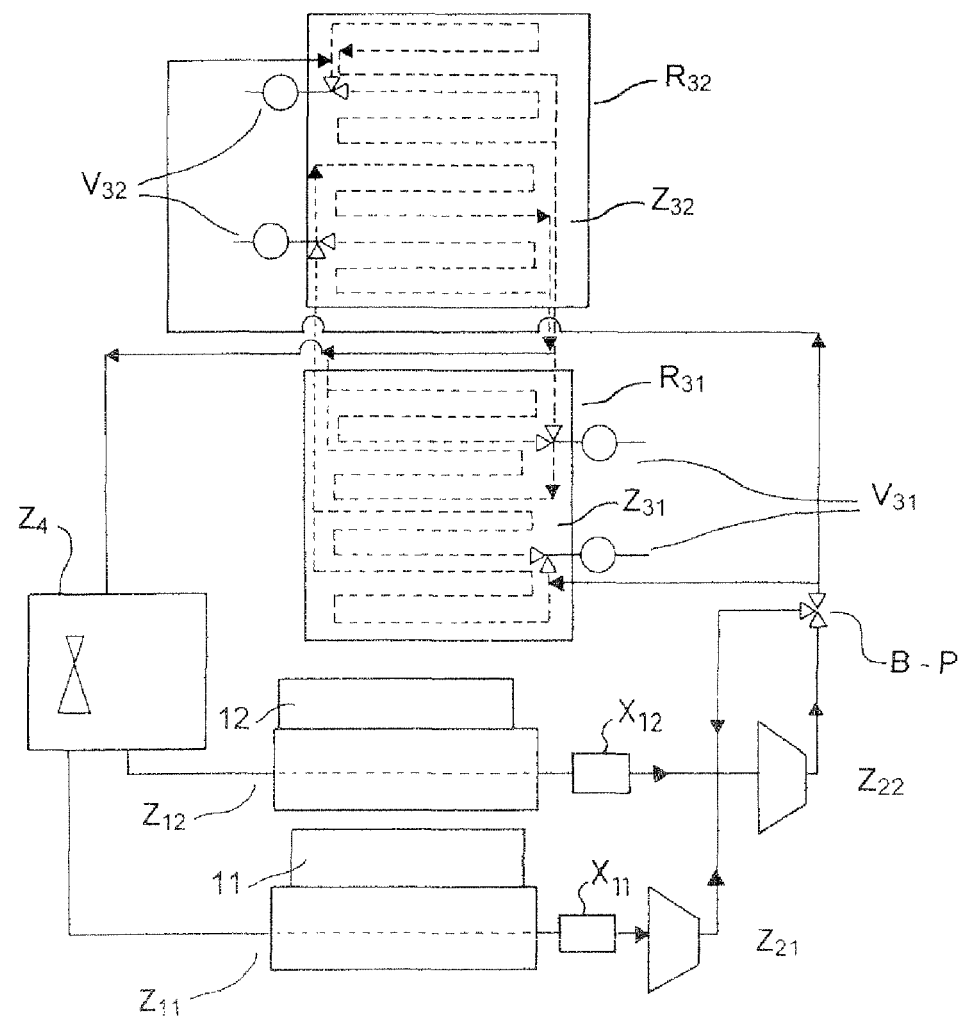
FIG. 2 illustrates an example of a device according to the invention.

FIG. 2 reveals in more detail all the various specific zones that provide the thermal system with a large capacity with regard to the loading of the thermal control through the life of the satellite.

1) Evaporation Zone $Z_1$

The refrigerant circulates within the evaporation zone inside tubes with standard geometrical properties or those that are to be locally designed. The tubes can, advantageously, be grooved if it is desired to increase the heat exchange coefficients (in relation to a smooth-tube configuration). The design of an optimal series/parallel hydraulic scheme depends on system constraints (energy to be transported, temperature ranges, arrangement of the equipment to be controlled), but also on the refrigerant chosen. FIG. 2 illustrates a configuration with two evaporation zones $Z_{11}$ and $Z_{12}$, each linked to respective dissipating elements 11 and 12.

2) Compression Zone $Z_2$

The compression zone can, advantageously, comprise several compression stages. The multistaging of the compression zone allows the satellite or equipment to be regulated at different temperature levels. These levels depend on, among other things, the type of equipment considered or the zone of the satellite concerned. This possibility allows the compressor's electrical consumption to be optimized. FIG. 2 thus illustrates the system for a two-stage configuration comprising two compression zones $Z_{21}$ and $Z_{22}$. It may be noted that it is the compression zone which, through its mechanical action on the refrigerant, ensures circulation of the latter through the whole of the system.

In the case of telecommunications satellites, magnetic-bearing centrifugal compressor technology can be adopted (little vibration, no need for lubrication, little friction, low electrical consumption, low bulk) because it combines well with the constraints of space, specifically with those in geostationary orbit, and with the strong constraint of long life.

Furthermore, it is advantageous to use a bypass radiator solution using a bypass B-P allowing the temperature of the vapour exiting the final compression stage to be raised in such a way as to obtain a fairly high condensation temperature without putting too much stress on the compressor, and this so as to be able to overcome hot radiator environments. Through a regulation principle this bypass regulates the quantity of refrigerant leaving the compressor that is taken back into the inlet of the latter. This possibility is particularly interesting when the refrigeration energy to be transported must remain low or moderate (system constraint). Typically, for a telecommunications satellite in the transfer phase, the solar generators (then partially or totally folded up) are able to face, according to the positioning in space of the satellite, a hot environment (incident solar flux). Considering an arrangement of satellite radiators fixed parallel to the North/South walls of the satellite, and hence situated below the solar generators during the transfer phase, the bypass solution allows the system to ensure the thermal control of several pieces of equipment of the satellite's payload in operation and in contact with Earth (limited electric power budget in this phase).

3) Condensation Zone $Z_3$

The refrigerant circulates within the condensation zone of the radiators inside tubes with standard dimensional properties or those that have to be locally designed.

Furthermore, it is possible to choose them to be grooved if it is desired to increase the heat exchange coefficients (in relation to a smooth-tube configuration). As with the evaporation zone the optimal series/parallel hydraulic scheme (and hence the number of branches) within the radiators depends on system constraints (energy to be transported, type of radiator structure chosen, etc.), but also on the refrigerant chosen. As for the radiators (which constitute the support structure of the condensation zone), the hydraulic scheme suggested is specific for two reasons:

firstly the passage of the refrigerant circulation through each radiator of the spacecraft limits the negative impact of asymmetric environments on the thermohydraulic functioning of the thermal system; this crossed circulation system is best investigated case by case; the final choice (which may be relatively complex as the number of radiators increases) depends largely on environmental effects on the condenser system. In the case of a telecommunications satellite, referring to the case of FIG. 2 comprising two condensation zones $Z_{31}$ and $Z_{32}$, each coupled to a radiator, $R_{31}$ and $R_{32}$, respectively (simplified for convenience to the two radiator case), circulation in one half of one radiator can simply take place before circulation in one half of the other radiator takes place (and this applies to the two lines in parallel);

Secondly, the system of automatic valves in the various branches of the condenser allows only part of the radiator surface to be used to remove the thermal dissipation; this means the evaporation zone can be kept at a minimum acceptable temperature level; generally speaking, the coupling of a moderately cold thermal environment for the radiators with a declining thermal loading to be transported (refrigeration energy) requires the closure of valves situated at the inlet of certain branches of each radiator (symmetry to be respected for reasons of thermohydraulic stability) in order to interrupt the circulation of refrigerant in the latter.

In the case of a telecommunications satellite, referring to the case of FIG. 2 (simplified for convenience to the two radiator case), it is possible to close one or two valves at each radiator (assembly $V_{31}$ and assembly $V_{32}$) in such a way as to have only 75% or 50% respectively of the radiator surface available to discharge the energy; this allows a fairly high condensation temperature to be maintained and hence an evaporation temperature above the system value to be respected.

4) Pressure Reduction Zone $Z_4$

The pressure reduction zone may include thermostatic pressure-reducing valves. The pressure-reducing valves constituting this pressure reduction zone may be arranged in series or in parallel with respect to the evaporation zone if there is multistage compression.

When the automatic valve solution is not desirable, or when the thermal energy to be transported becomes really low or even zero during a phase of the satellite's life, the thermal dissipation of the satellite or of the equipment concerned can be replaced by heating. The opportunity must be noted here of being able to heat centrally, that is to have a set of heaters more or less grouped together and located somewhere on the tubing downstream of the condenser and upstream of the compressor. These heating zones $X_{11}$ and $X_{12}$, referred to in FIG. 2, are nothing but new evaporation zones that are used if needed according to a regulation principle.

The advantages of this solution are multiple, and are specifically in the case of a telecommunications platform of given dimensions:

an increase in the discharge capacity of its walls in terms of the energy that can be radiated into space for a range of temperatures of a given payload (very dissipative missions being conceivable for moderately sized platforms);

removal of the need for deployable radiators and therefore limitation of the additional bulk and mass generated by thermal control;

radiation around 100° C. in the North and South panels doubling the thermal energy that can be removed by the walls of the platform in relation to today;

the possibility of using the East and West walls, or even the Earth (if there is no antenna module) and anti-Earth walls in the case of an extremely dissipative payload; and an increase in the payload capacity per kg of the satellite.

Thanks to the modularity of the various functional zones, the device of the invention both allows the problem of the dissipated energy/consumed energy ratio, which is tending to increase in view of future telecommunications satellite missions, to be dealt with and provides possibilities for regulating the compressor and a number of active condenser lines; this allows variable conductance operation and a large reduction in the need for and the size of heating lines. It allows the payload to be controlled in several temperature ranges (system constraint) due to the multistage compression principle for minimizing the electrical consumption necessary for compression.

We are going to describe below the integration of the device of the invention in a telecommunications satellite. Indeed, the device of the invention can specifically be used in a very advantageous manner for the thermal control of a telecommunications payload. At present the thermal dissipation of these payloads is removed into space via the North and South support panels of the equipment, which on their external face therefore also serve as radiators. With this system of thermal control it becomes possible to remove the payload heat by using radiating plates fixed externally to the North and South panels, at best parallel to and conductively and radiatively decoupled from the latter. The external surface of the North and South walls is then no longer used for radiating purposes, but is covered with an insulating coating to preserve the equipment inside from the high temperature levels of the radiators.

Figure 3:
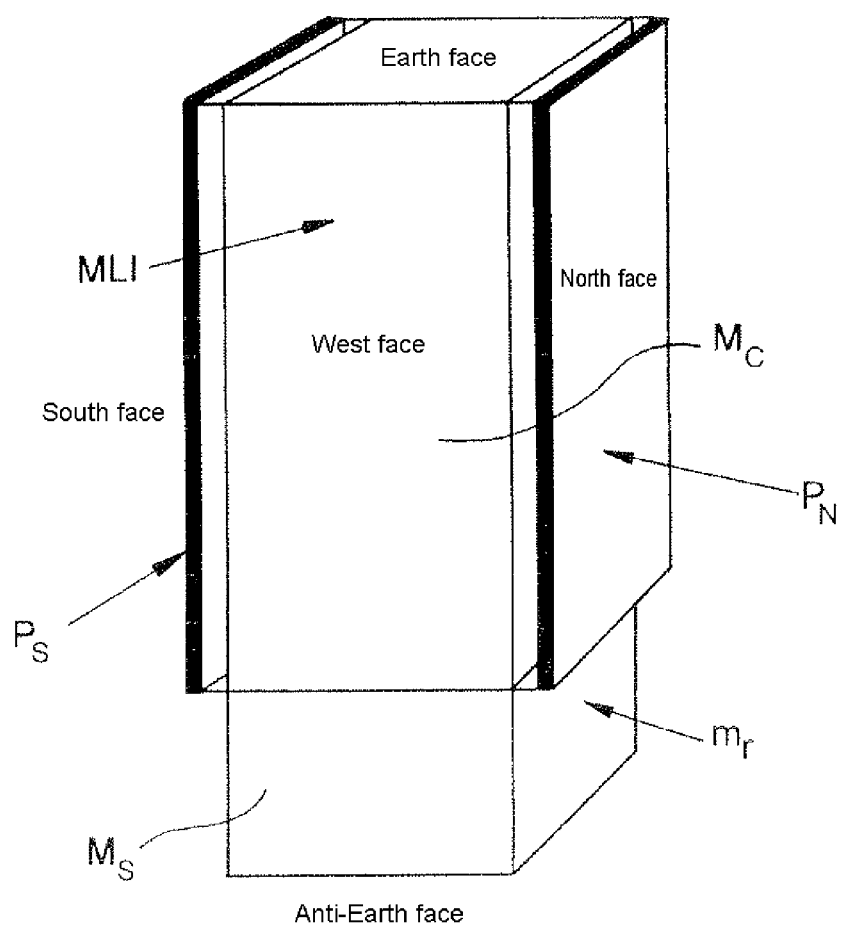
FIG. 3 illustrates an example of the external architecture used in a telecommunications satellite that integrates a device of the invention.

With such a solution, optimal arrangement of equipment inside the communication module (with or without the use of additional internal shelves) linked with an appropriate choice of solar generators allows the size of telecommunications satellites to be optimized, that is to make them more dense (strong launch impact). FIG. 3 schematically illustrates the external radiator architecture as proposed for this example of a thermal control solution for telecommunications satellites. The radiating plates $P_N$ and $P_S$ are fixed externally to the North and South faces of the satellite and parallel to the latter. These radiating plates are best conductively and radiatively decoupled from the satellite and comprise the condensation zone of the thermal dissipation discharge device. The North, South, East and West faces of the satellite's communication module Mc are covered with a conventional multilayer coating called "MLI" and referred to as MLI (Multi-Layer Insulation), in contrast to structures of the prior art which necessitated coating the North and South faces with a mirror coating. These radiating plates are positioned opposite the North and South faces of the satellite at the communication module, the point where thermal problems are greatest. For the service module conventional thermal control solutions based on heat pipes and mirror coatings for the radiators $m_r$ (on the North and South faces) may still be used as the thermal problems are of lesser proportion. The invention is nonetheless extendable to the service module Ms if necessary.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A thermal control device intended to remove the heat generated by heat dissipating equipment on a spacecraft comprising a number of surfaces and including:
   means for circulating a refrigerant;
   an evaporation zone comprising means for circulating the refrigerant;
   a compression zone;
   a condensation zone comprising at least one radiating panel, each radiating panel comprising at least two parts, each part of the radiating panel linked to several parallel U-shaped hydraulic branches of the means for circulating the refrigerant, some of the hydraulic branches within each part of the radiating panels comprising means to allow or inhibit the circulation of said refrigerant within said some of the hydraulic branches so as to vary the area of the heat exchange surface of each panel in the condensation zone; and
   a pressure reduction zone comprising means for circulating the refrigerant.

2. The thermal control device according to claim 1, wherein the condensation zone comprises at least two radiating panels, each radiating panel composed of several parts, the means for circulating the refrigerant belonging to one part of a first radiating panel being mounted in series with the means for circulating the refrigerant belonging to one part of a second radiating panel or with the pressure reduction zone.

3. Thermal control device according to claim 2, wherein the number n of parts per radiating panel is equal to the number n of radiating panels, the n radiating panels being connected in series by n−1 means of circulation, the n parts being passed through by the refrigerant having an identical discharge area.

4. Thermal control device according to claim 2, wherein the branches are tubes with grooved internal surfaces.

5. The thermal control device according to claim 2, wherein at each radiating panel the condensation zone comprises a system of automatic valves allowing all or part of the surface of the radiating panel to be used to remove heat.

6. The thermal control device according to claim 2, wherein the evaporation zone furthermore comprises centralized means of heating.

7. The thermal control device according to claim 2, wherein the evaporation zone comprises one or more pieces of said heat dissipating equipment controllable at either a single temperature level or at several different temperature levels.

8. Thermal control device according to claim 1, wherein the number of parts n per radiating panel is equal to the number of radiating panels n, the n radiating panels being connected in series by n−1 means of circulation, the n parts being passed through by the refrigerant having an identical discharge area, wherein n is an integer greater than one.

9. Thermal control device according to claim 1, wherein the branches are tubes with grooved internal surfaces.

10. The thermal control device according to claim 1, wherein at each radiating panel the condensation zone comprises a system of automatic valves allowing all or part of the surface of the radiating panel to be used to remove heat.

11. The thermal control device according to claim 1, wherein the evaporation zone furthermore comprises centralized means of heating.

12. The thermal control device according to claim 1, wherein the evaporation zone comprises one or more pieces of said heat dissipating equipment controlled at a single temperature level or at several different temperature levels.

13. The thermal control device according to claim 1, wherein the compression zone comprises several compression stages, the number of stages being equal to the number of temperature levels of the evaporator to be controlled.

14. The thermal control device according to claim 1, wherein the compression zone comprises at least one magnetic-bearing centrifugal compressor.

15. The thermal control device according to claim 1, comprising a bypass system between the compression zone and the condensation zone, allowing the outlet of the compression zone to be linked to the inlet of the compression zone, or to the inlet of the final stage of compression if the compression is multistage, and the temperature of the refrigerant exiting the compression zone to be adjusted.

16. A telecommunications spacecraft including a thermal control device according to claim 1.

17. The telecommunications spacecraft according to claim 16 and with faces commonly called North and South, characterized in that it comprises external radiating panels, fixed to the North and South faces, equipped with the condensation zone of the thermal control device, said radiating panels being conductively and radiatively decoupled from these North and South faces.

18. The telecommunications spacecraft according to claim 17, comprising said evaporation, said compression and said pressure reduction zones inside the spacecraft.

19. The telecommunications spacecraft according to claim 16, comprising a communication module and a service module, the external radiating panels being situated at the communication module.

20. Telecommunications spacecraft according to claim 16, comprising external radiating panels fixed to the panels commonly called the East, West, Earth and anti-Earth panels and parallel to the latter.

* * * * *